(12) United States Patent
Suzuki et al.

(10) Patent No.: US 10,099,173 B2
(45) Date of Patent: Oct. 16, 2018

(54) HUMIDITY CONTROLLING APPARATUS

(71) Applicant: Sharp Kabushiki Kaisha, Sakai-shi, Osaka (JP)

(72) Inventors: Yasumasa Suzuki, Sakai (JP); Nobuki Sakikawa, Sakai (JP); Yoshihiro Uramoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 60 days.

(21) Appl. No.: 15/122,423

(22) PCT Filed: Jun. 11, 2015

(86) PCT No.: PCT/JP2015/066809
§ 371 (c)(1),
(2) Date: Aug. 30, 2016

(87) PCT Pub. No.: WO2016/035410
PCT Pub. Date: Mar. 10, 2016

(65) Prior Publication Data
US 2017/0113180 A1    Apr. 27, 2017

(30) Foreign Application Priority Data
Sep. 5, 2014 (JP) ................. 2014-181290

(51) Int. Cl.
*B01D 53/26* (2006.01)
*B01J 20/26* (2006.01)
(Continued)

(52) U.S. Cl.
CPC .......... *B01D 53/261* (2013.01); *B01D 53/06* (2013.01); *B01J 20/26* (2013.01); *F24F 3/1423* (2013.01);
(Continued)

(58) Field of Classification Search
CPC ................. B01D 53/06; B01D 53/261; B01D 2253/108; B01D 2253/20;
(Continued)

(56) References Cited

U.S. PATENT DOCUMENTS 2,399,246 A * 4/1946 Patrick, Jr. ................ F26B 5/04
159/11.2
3,140,936 A * 7/1964 Schwartz .............. F24F 3/1423
96/125
(Continued)

FOREIGN PATENT DOCUMENTS

CN   101291718 A   10/2008
JP   06-327926 A   11/1994
(Continued)

OTHER PUBLICATIONS

Official Communication issued in International Patent Application No. PCT/JP2015/066809, dated Aug. 25, 2015.

*Primary Examiner* — Frank M Lawrence, Jr.
(74) *Attorney, Agent, or Firm* — ScienBiziP, P.C.

(57) ABSTRACT

A humidity controlling apparatus comprising: a moisture absorption unit including a base material rotatable about a rotation shaft and a macromolecular moisture absorbent provided in a layer on an outer periphery of the base material; and a heat source partially heating the moisture absorption unit, the macromolecular moisture absorbent having a hydrophilic state capable of absorbing moisture in the air and a hydrophobic state which releases the moisture sorbed in the hydrophilic state, the macromolecular moisture absorbent having a nature such that when temperature rises, the macromolecular moisture absorbent changes from the hydrophilic state to the hydrophobic state, and when the temperature falls, the macromolecular moisture absorbent returns from the hydrophobic state to the hydrophilic state, requires small thermal energy and can efficiently control humidity.

4 Claims, 3 Drawing Sheets

(51) Int. Cl.
*F24F 3/14* (2006.01)
*B01D 53/06* (2006.01)

(52) U.S. Cl.
CPC .... *B01D 2253/108* (2013.01); *B01D 2257/80* (2013.01); *F24F 2003/1458* (2013.01)

(58) Field of Classification Search
CPC .......... B01D 2253/202; B01D 2257/80; B01J 20/26; F24F 3/1423; F24F 2003/1458
USPC ............. 96/128, 126, 149; 95/113, 117, 126
See application file for complete search history.

(56) References Cited

U.S. PATENT DOCUMENTS

| | | | | |
|---|---|---|---|---|
| 5,534,186 A | * | 7/1996 | Walker | B01D 53/261 252/194 |
| 9,216,405 B1 | * | 12/2015 | Tan | B01J 20/264 |
| 2009/0314160 A1 | | 12/2009 | Meijer | |
| 2011/0239867 A1 | * | 10/2011 | Matsuba | F24F 3/1423 96/143 |
| 2013/0309927 A1 | * | 11/2013 | Jangbarwala | B01D 53/28 442/119 |
| 2014/0150651 A1 | * | 6/2014 | Velasco Valcke | B01D 5/0024 95/126 |
| 2017/0282120 A1 | * | 10/2017 | Uramoto | B01D 53/261 |

FOREIGN PATENT DOCUMENTS

| | | |
|---|---|---|
| JP | 2000-126540 A | 5/2000 |
| JP | 2002-126442 A | 5/2002 |
| JP | 2008-142656 A | 6/2008 |
| JP | 2009-511261 A | 3/2009 |
| JP | 2010-069428 A | 4/2010 |
| WO | 2007/026023 A1 | 3/2007 |

\* cited by examiner

HUMIDITY CONTROLLING APPARATUS

TECHNICAL FIELD

The present invention relates to a humidity controlling apparatus which utilizes a macromolecular adsorbent which has a nature allowing it to vary from being hydrophilic to being hydrophobic and vice versa as temperature varies.

BACKGROUND ART

Zeolite, silica gel, etc. have conventionally been widely known as a moisture absorbent (a dehumidifying agent), and desiccant moisture absorption (dehumidification) apparatuses utilizing these are commercially available (see Japanese Patent Laying-Open No. 2000-126540 (patent document 1), Japanese Patent Laying-Open No. 2010-69428 (patent document 2), etc. for example). Such a dehumidifier utilizing zeolite, silica gel, etc. exposes an air permeable honeycomb rotor having zeolite, silica, etc. applied thereto to indoor air to adsorb moisture in the air, and, to extract the moisture therefrom, employs a heater to blow high temperature air to heat it to be water vapor and thus released. High temperature air containing the water vapor is cooled by a heat exchanger to extract moisture to thus dehumidify indoor air.

Conventional moisture absorbents such as zeolite and silica gel require large heat energy in order to desorb moisture. More specifically, these moisture absorbents after having adsorbed moisture need to be heated to such a significantly high temperature as 200 degrees centigrade or higher to have the moisture removed therefrom so that they are recycled to have a moisture absorbable state. The above desiccant moisture absorption (dehumidification) apparatus adopts a structure which divides a moisture absorbing portion and a heated portion and causes a rotor to rotate to allow constant moisture absorption and desorption, and accordingly, requires constantly energizing a heater, which consumes large electric power and also has a possibility of firing by heating at high temperature. Furthermore, the blown air is also heated after dehumidification and thus discharged, which results in excessively high room temperature, and there is also a concern voiced about using the apparatus in the rainy season having high temperature and high humidity in particular. Furthermore, for the conventional desiccant moisture absorption apparatus to desorb moisture and change it into water, it is also necessary to cool air once heated.

In contrast, Japanese Patent Laying-Open No. 2002-126442 (patent document 3) describes a gel sheet which uses a gel having a water absorption property varying across a phase transition temperature to remove moisture and absorb water.

CITATION LIST

Patent Documents

Patent document 1: Japanese Patent Laying-Open No. 2000-126540

Patent document 2: Japanese Patent Laying-Open No. 2010-69428

Patent document 3: Japanese Patent Laying-Open No. 2002-126442

SUMMARY OF INVENTION

Technical Problem

The present invention has been made to address the above issue and contemplates a humidity controlling apparatus which requires small thermal energy and can efficiently control humidity.

Solution to Problem

A humidity controlling apparatus of the present invention comprises: a moisture absorption unit including a base material rotatable about a rotation shaft and a macromolecular moisture absorbent provided in a layer on an outer periphery of the base material; and a heat source partially heating the moisture absorption unit, the macromolecular moisture absorbent having a hydrophilic state capable of absorbing moisture in the air and a hydrophobic state which releases the moisture sorbed in the hydrophilic state, the macromolecular moisture absorbent having a nature such that when temperature rises, the macromolecular moisture absorbent changes from the hydrophilic state to the hydrophobic state, and when the temperature falls, the macromolecular moisture absorbent returns from the hydrophobic state to the hydrophilic state.

In the humidity controlling apparatus of the present invention, preferably, the moisture absorption unit is configured such that while the moisture absorption unit is rotated about the rotation shaft the moisture absorption unit can release absorbed atmospheric moisture in a droplet at a portion of the moisture absorption unit heated by the heat source.

In the humidity controlling apparatus of the present invention, preferably, the base material is a solid or hollow cylinder.

In the humidity controlling apparatus of the present invention, preferably, a water collecting unit including a base material in a solid or hollow cylinder and a moisture absorbing material formed in a layer on an outer periphery of the base material in the solid or hollow cylinder and adsorbing moisture and capable of releasing the moisture when the moisture absorbing material is compressed, is provided adjacent to the moisture absorption unit. In that case, it is preferable that the moisture absorption unit be adjacent to the water collecting unit in a state in which the moisture absorption unit is compressed by the water collecting unit.

Advantageous Effects of Invention

The humidity controlling apparatus of the present invention, in contrast to a conventional desiccant moisture absorption apparatus, can release absorbed moisture without heating it to a significantly high temperature or cooling air once heated, and requires small thermal energy and can also efficiently control humidity.

DESCRIPTION OF EMBODIMENTS

Figure 1:
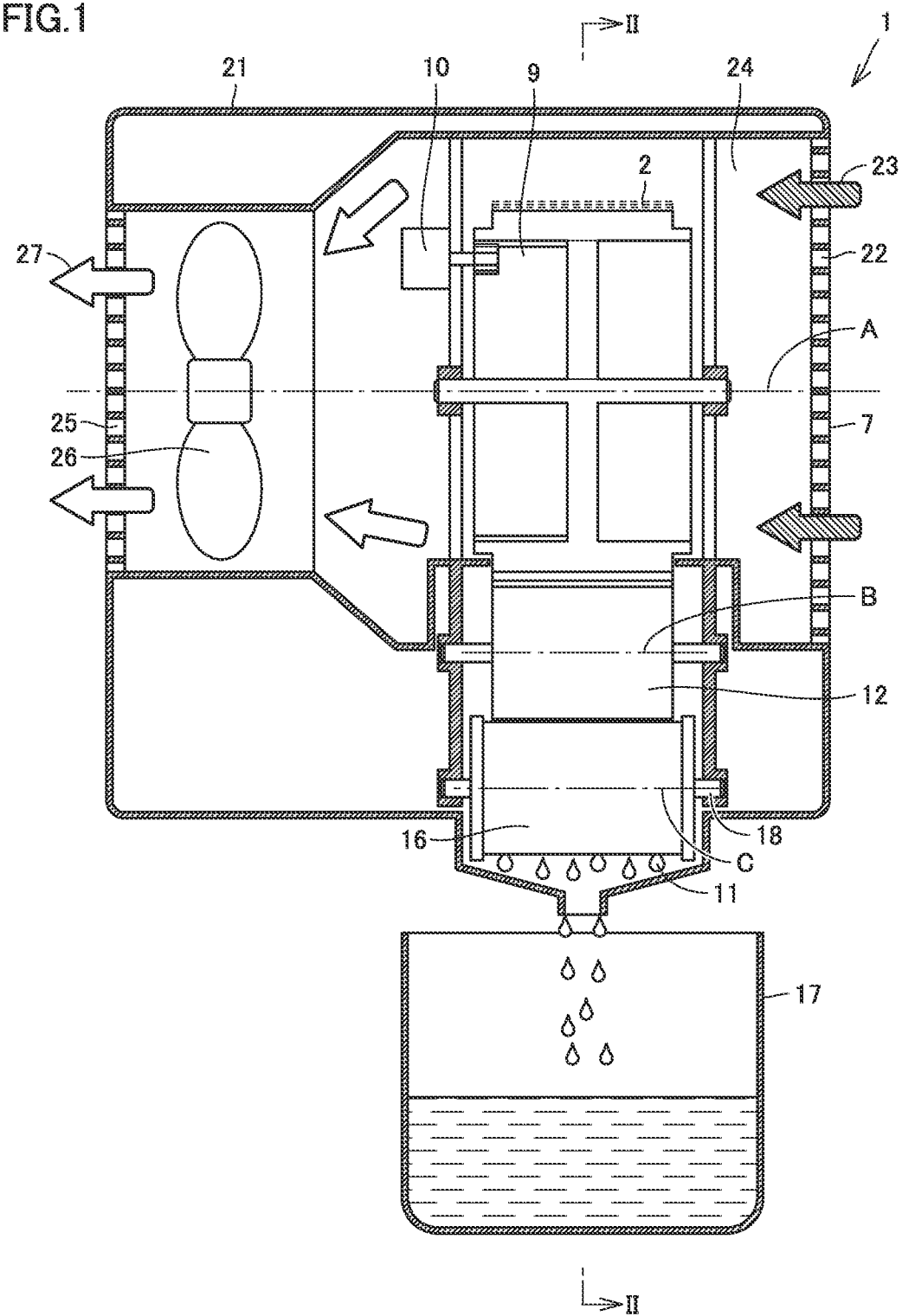
FIG. 1 is a cross section of a humidity controlling apparatus 1 of a preferable example of the present invention as seen along a cutting cross sectional line I-I.
Figure 2:
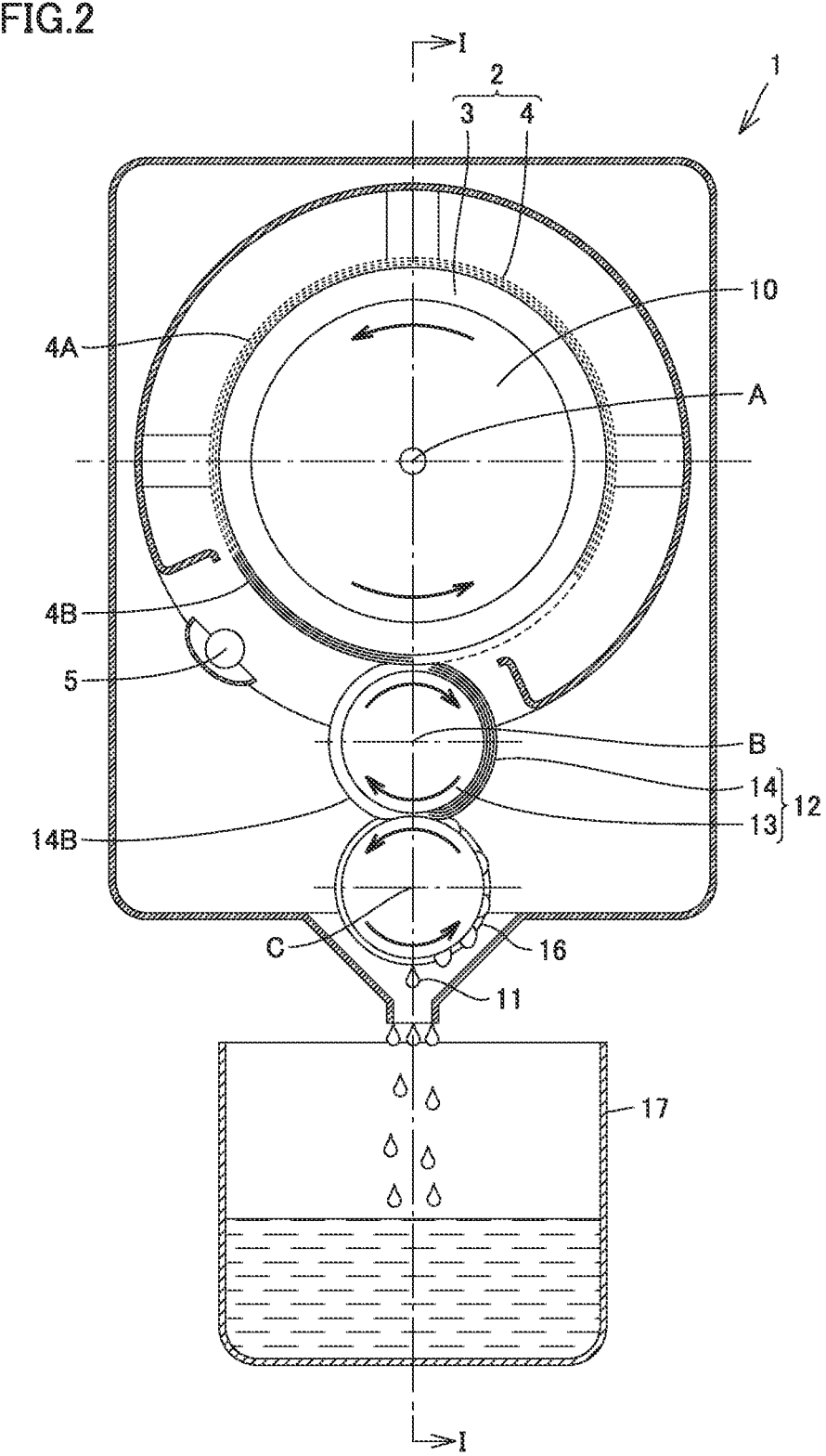
FIG. 2 is a cross section of humidity controlling apparatus 1 of the preferable example of the present invention as seen along a cutting cross sectional line II-II.

FIG. 1 is a cross section of a humidity controlling apparatus 1 of a preferable example of the present invention as seen along a cutting cross sectional line I-I, and FIG. 2 is a cross section of humidity controlling apparatus 1 of the preferable example of the present invention as seen along a cutting cross sectional line II-II. Hereinafter, while the example shown in FIGS. 1 and 2 will be referred to more specifically describe the present invention, humidity controlling apparatus 1 shown in FIGS. 1 and 2 is only a preferable example of the present invention, and the present invention should not be limited to this example.

Humidity controlling apparatus 1 of the present invention basically comprises a moisture absorption unit 2 including a base material 3 rotatable about a rotation shaft and a macromolecular moisture absorbent 4 provided on an outer periphery of base material 3 in a layer, and a heat source 5 which partially heats said moisture absorption unit 2. Humidity controlling apparatus 1 of the present invention, in contrast to a conventional desiccant moisture absorption apparatus, can release absorbed moisture without heating it to a significantly high temperature or cooling air once heated, and requires small thermal energy and can also efficiently control humidity (i.e., achieve low power consumption, suppression of rise of room temperature, and efficient dehumidification).

First Embodiment: Base Material

In the present invention base material 3 is not limited to any particular shape as long as it is rotatable about a rotation shaft, and it may be in the form of a solid cylinder, a hollow cylinder, a solid triangular prism, a hollow triangular prism, a solid quadrangular prism, a hollow quadrangular prism, a solid polygonal prism, a hollow polygonal prism, a sphere having a round cross section, a sphere having an elliptical cross section, a disk, a flat plate, a polyhedron, a wire, or other indefinite shapes, although it is preferably a solid cylinder, a hollow cylinder, a disk, or a flat plate as it facilitates forming a layer of the macromolecular moisture absorbent, has consistency with a heated portion, allows an overall balance co-establishing moisture absorption and water releasing, and furthermore, allows efficient humidity control with the macromolecular moisture absorbent utilized.

Base material 3 is not limited to any particular material, either, and can be formed of metal, resin, ceramic, rubber, glass paper, etc. Inter alia, in view of thermal conductivity, metal (e.g., iron), highly heat-conductive resin, or ceramic is preferable.

Macromolecular moisture absorbent 4 formed on base material 3 in the form of a layer has a hydrophilic state capable of absorbing moisture in the air and a hydrophobic state which releases the moisture sorbed in the hydrophilic state, and macromolecular moisture absorbent 4 has a nature such that when temperature rises, it changes from the hydrophilic state to the hydrophobic state, and when the temperature falls, it returns from the hydrophobic state to the hydrophilic state. Such a macromolecular moisture absorbent in the present invention is known from patent document 3 etc., and a skilled artisan would for example use poly-N-isopropylacrylamide (PNIPAM) and a derivative thereof, and furthermore, polysaccharides, polyalginic acid, or a similar polyelectrolyte as a material to prepare as appropriate a macromolecular moisture absorbent which has a desired nature.

Second Embodiment: Macromolecular Moisture Absorbent

When the macromolecular moisture absorbent in the present invention as described above is implemented as zeolite, silica gel or the like, it does not require a heat source of high temperature such as required to desorb adsorbed moisture (e.g. 200 degrees centigrade) and thus requires small thermal energy. Furthermore, using zeolite, silica gel or the like is also advantageous in that it does not entail cooling to collect desorbed moisture as water and allows the moisture to be collected from the macromolecular moisture absorbent as it is.

The thickness of the layer of macromolecular moisture absorbent 4 is not limited to any particular thickness, however, it can be determined as appropriate considering its moisture absorption rate, thermal conductivity when it is heated, overall size, and the like. Excessively large thickness as a matter of course increases the amount of moisture that the layer of macromolecular moisture absorbent 4 singly contains therein, however, it decreases a speed required to absorb moisture and also provides a tendency to slow thermal conduction when macromolecular moisture absorbent 4 is heated.

In the present invention, between base material 3 and the layer of macromolecular moisture absorbent 4, although depending on the base material's material, for example when the base material is formed of ceramic, it is preferable that a conventionally known, appropriate adhesive is interposed therebetween.

Third Embodiment: Base Material (Metal Bonding)

Figure 3:
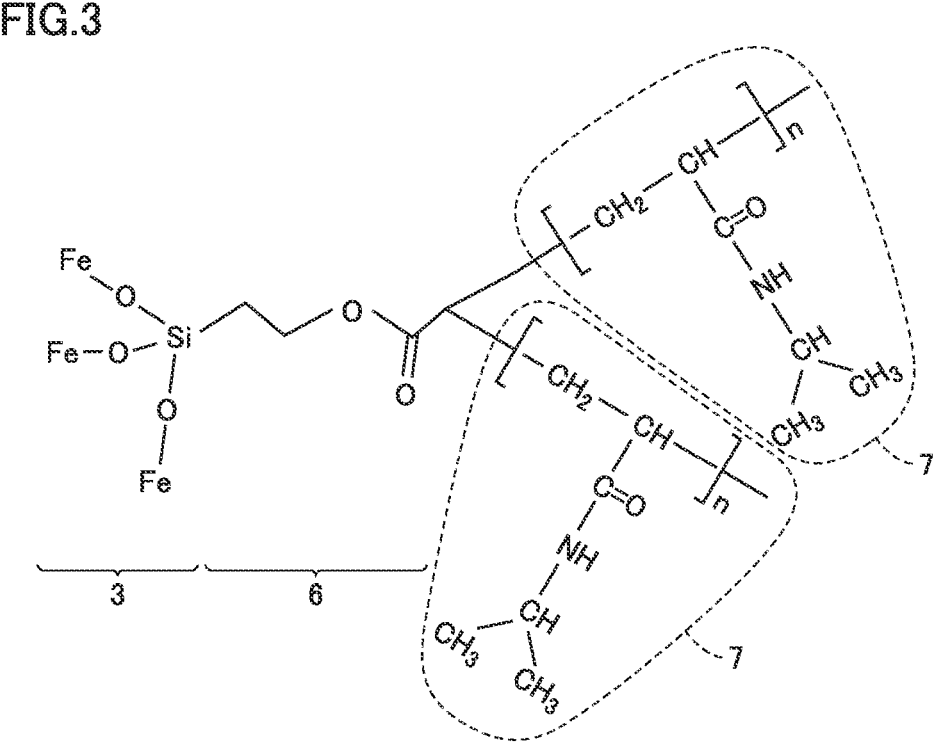
FIG. 3 schematically shows an example of bonding a macromolecular moisture absorbent in the present invention when a base material is metal (exemplified by iron).

Furthermore, FIG. 3 schematically shows an example of bonding macromolecular moisture absorbent 4 in the present invention when base material 3 is metal (the figure shows iron of a surface of SUS). A technique of bonding an organic matter such as resin and an inorganic matter such as metal is known for example for a heater from Japanese Patent Laying-Open No. 2013-007355 and WO2013/140845. For example, when base material 3 is metal (e.g., SUS), an oxide film on a surface of the metal is removed and thereafter an alkyl chain (a principal chain) of macromolecular moisture absorbent (e.g., N-isopropylacrylamide (NIPAM)) 4 is bonded via silane coupling 6 so that the inorganic matter, or the metal, and the inorganic matter, or macromolecular moisture absorbent 4, are strongly bonded together by strong bonding different from hydrogen bonding or van der Waals force. The metal's material, the silane coupling's type, macromolecular moisture absorbent 4's type are of course not limited thereto. Silane coupling 6 can be done using a conventionally known, appropriate silane coupling agent, and it is not limited to any particular one, although as a suitable example, 3-acryloxy-propyl-trimethoxysilane (KBM-5103 (produced by Shin-Etsu Chemical Co., Ltd.)) can be referred to, and silane coupling 6 can be suitably performed through a known procedure under a known condition, respectively.

Humidity controlling apparatus 1 of the example shown in FIGS. 1 and 2 has moisture absorption unit 2 with base material 3 fitted into a rotor 9 and configured to be driven by a rotor drive motor 10 that is connected to rotor 9 to rotate about a rotation shaft A. Rotor 9 and rotor drive motor 10 can be any conventionally known appropriate ones unless otherwise limited. The rate of rotation about rotation shaft A is not limited to any particular value, however, an optimum value thereof is spontaneously determined from the material's moisture absorption, water releasing ability, speed, thermal conductivity, and scale.

Fourth Embodiment: Heat Source

Heat source 5 in humidity controlling apparatus 1 of the present invention is not limited to any particular heat source and may be any conventionally known appropriate heat source such as a sheath heater, a film heater, a heating wire-incorporated heating material, a carbon heater or the like. Herein, as has been described above, when macromolecular moisture absorbent 4 in the present invention desorbs absorbed moisture, it does not require significantly high temperature as zeolite, silica gel and the like conventionally does, and the heat source in the present invention is only required to be capable of heating to ordinary temperature (23 degrees centigrade) and in addition preferably a range of 40-60 degrees centigrade, although depending on the thermosensitive point of the macromolecular moisture absorbent to be heated. Thus the humidity controlling apparatus of the present invention allows a heating temperature to be set to be lower than conventional and can thus save power and reduce a possibility of firing and smoking. Furthermore, the humidity controlling apparatus is also advantageous in that it facilitates configuring a heated portion (on/off) and a non-heated portion to be divided from each other to thus allow moisture to be constantly absorbed and released (i.e., to allow the non-heated portion to absorb moisture and the heated portion to release moisture).

In humidity controlling apparatus 1 of the present invention, heat source 5 is only required to be disposed at a position allowing macromolecular moisture absorbent 4 to be partially heated to the thermosensitive point or higher (although an example is shown in which the heat source is disposed at a distance from an outer side of the moisture absorbent, it is more preferable to provide heating from the side of the base material). By heating by heat source 5, the macromolecular moisture absorbent having absorbed moisture in the air and thus being hydrophilic is given a stimulus of an increase of temperature by heat source 5, and by this increase in temperature, macromolecular moisture absorbent 4 performs phase transition to the hydrophobic state, and the absorbed moisture is collected as a water droplet 11. As shown in the example shown in FIGS. 1 and 2, it is preferable that macromolecular moisture absorbent 4 be formed in a layer on an outer periphery of base material 3 of a solid cylinder or a hollow cylinder to form moisture absorption unit 2, rotation shaft A of base material 3 be parallel to a horizontal direction, and heat source 5 be disposed on any side below rotation shaft A of base material 3 that is downstream, as seen in the direction of rotation, of a side above rotation shaft A. By this arrangement, the macromolecular moisture absorbent absorbs moisture on a side upstream in the direction of rotation and is thus hydrophilic (In FIG. 2, an area 4A of macromolecular moisture absorbent 4), and when the macromolecular moisture absorbent rotates to a side downstream in the direction of rotation it is heated by heat source 5 and thus hydrophobic (in FIG. 2, an area 4B of macromolecular moisture absorbent 4), and thus allows the moisture to be efficiently collected as water droplet 11.

Fifth Embodiment: Water Collecting Unit

Preferably, humidity controlling apparatus 1 of the present invention is provided with a water collecting unit 12 adjacent to moisture absorption unit 2 for efficiently collecting moisture from moisture absorption unit 2. Water collecting unit 12 is preferably configured such that, as shown in FIGS. 1 and 2, a base material 13 in the form of a solid or hollow cylinder is peripherally provided with a moisture absorbing material 14 formed in a layer and adsorbing moisture and capable of releasing the moisture when moisture absorbing material 14 is compressed. Such a water collecting unit 12 provided adjacent to moisture absorption unit 2 can be rotated about a rotation shaft B of base material 13 parallel to rotation shaft A as moisture absorption unit 2 rotates about rotation shaft A, to collect moisture from moisture absorption unit 2 more efficiently.

Base material 13 in water collecting unit 12 is not limited to any particular material, and it can be formed of metal, resin, ceramic, rubber, etc. Inter alia, when considering that the moisture absorption unit is heated to have moisture extracted therefrom and thereafter has heat removed therefrom (or is quickly returned to the hydrophilic state), a highly thermally conductive material, metal, a highly thermally conductive resin, or a composite thereof, in particular, is preferable.

Moisture absorbing material 14 in water collecting unit 12 is only required to be a chemical sponge or a water-absorptive chemical fiber which prevents a water molecule from being chemically bonded and instead retains the water molecule mainly by capillarity and van der Waals force and has elasticity allowing the water molecule to be released by physical pressure, and, if it is a natural material, it may be sponge, cotton, a thick paper material or the like, and although not particularly limited, conventionally known sponge is preferable. However, attention should be paid to durability, considering abrasion and degradation caused by contact.

Sixth Embodiment: Moisture Absorption Unit

Furthermore, humidity controlling apparatus 1 of the present invention preferably has moisture absorption unit 2 adjacent to water collecting unit 12 in a state in which moisture absorption unit 2 is compressed by water collecting unit 12. In the example shown in FIGS. 1 and 2, a compression roller 16 is provided adjacent to a side of water collecting unit 12 opposite to that of water collecting unit 12 in contact with moisture absorption unit 2, and compression roller 16 applies pressure via water collecting unit 12 to moisture absorption unit 2 in a direction perpendicular to rotation shafts A and B. This allows moisture to be efficiently collected when moisture absorbing material 14 of water collecting unit 12 is sponge, in particular. The compression by compression roller 16 can be determined as appropriate, considering efficient moisture collection, the mechanical resistance (or strength) of water collecting unit 12 and moisture absorption unit 2, coefficient of friction, and the like. Furthermore, in the example shown in FIGS. 1 and 2, the moisture having travelled the moisture absorption unit and the water collecting unit to the compression roller drops to a drain tank 17 disposed directly below and is thus collected. The compression roller can be any known appropriate roller that is used for a similar purpose, unless otherwise limited.

Herein, while the macromolecular moisture absorbent used in the present invention has a moisture absorption capacity of several tens times or more of its self-weight when it is brought into direct contact with water, it only absorbs moisture in the air in an amount at most approximately twice of its self weight. As such, when the macromolecular moisture absorbent having absorbed moisture in the air is heated to exceed the thermosensitive point to release the adsorbed moisture, the moisture continues to adhere to a surface of the macromolecular moisture absorbent (i.e., exudes to and thus wet the surface of the macromolecular moisture absorbent), and may not easily form a droplet. Furthermore, external heating forms a hydrophobic film on an external periphery of the macromolecular moisture absorbent and thus prevents a water molecule from moving (i.e., the skin effect) and it is thus difficult to co-establish a heated surface and a water releasing surface, however, the outermost surface releases water as the outermost surface is heated, and, to utilize both the water inside the film and that on the surface, it is better to place importance on heating from the side of the base material. As has been described above, preferably by including water collecting unit 12, and still preferably by exerting pressure from water collecting unit 12 to moisture absorption unit 2, the moisture released in the hydrophobic state as the macromolecular moisture absorbent exceeds the thermosensitive point, that cannot drop by its self weight, can be squeezed out to allow efficient moisture collection.

In the example shown in FIGS. 1 and 2, humidity controlling apparatus 1 is provided in a casing 21 having an air suction port 22 on a side surface at a level corresponding to moisture absorption unit 2, and a space between air suction port 22 and moisture absorption unit 2 serves as an area 24 in which, by moist air 23 entering casing 21 through air suction port 22, the macromolecular moisture absorbent absorbs moisture in the air to be hydrophilic (i.e., a moisture absorbing area). To cause moist air 23 to enter through air suction port 22, in the example shown in FIGS. 1 and 2, an exhaust port 25 is also provided opposite to air suction port 22 with moisture absorption unit 2 interposed, and a fan 26 is provided in front of exhaust port 25 (on a side closer to moisture absorption unit 2) for moisture absorption and is configured to exhaust dry air 27 through exhaust port 25 out of casing 21.

REFERENCE SIGNS LIST

1: humidity controlling apparatus; 2: moisture absorption unit; 3: base material; 4: macromolecular moisture absorbent; 5: heat source; 6: silane coupling; 7: macromolecular moisture absorbent; 9: rotor; 10: rotor drive motor; 11: water droplet; 12: water collecting unit; 13: base material; 14: moisture absorbing material; 16: compression roller; 17: drain tank; 21: casing; 22: air suction port; 23: moist air; 24: moisture absorbing area; 25: exhaust port; 26: fan for moisture absorption; 27: dry air.

The invention claimed is:
1. A humidity controlling apparatus comprising:
a moisture absorption unit including a base material rotatable about a rotation shaft and a macromolecular moisture absorbent provided in a layer on an outer periphery of the base material; and
a heat source partially heating the moisture absorption unit,
the macromolecular moisture absorbent having a hydrophilic state capable of absorbing moisture in the air and a hydrophobic state which releases the moisture sorbed in the hydrophilic state, the macromolecular moisture absorbent having a nature such that when temperature rises, the macromolecular moisture absorbent changes from the hydrophilic state to the hydrophobic state, and when the temperature falls, the macromolecular moisture absorbent returns from the hydrophobic state to the hydrophilic state, wherein
a water collecting unit including a base material in a solid or hollow cylinder and a moisture absorbing material formed in a layer on an outer periphery of the base material in the solid or hollow cylinder and absorbing moisture and capable of releasing the moisture when the moisture absorbing material is compressed, is provided adjacent to the moisture absorption unit.
2. The humidity controlling apparatus according to claim 1, wherein the moisture absorption unit is configured such that while the moisture absorption unit is rotated about the rotation shaft the moisture absorption unit can release absorbed atmospheric moisture in a droplet at a portion of the moisture absorption unit heated by the heat source.
3. The humidity controlling apparatus according to claim 1 wherein the base material is a solid or hollow cylinder.
4. The humidity controlling apparatus according to claim 1, wherein the moisture absorption unit is adjacent to the water collecting unit in a state in which the moisture absorption unit is compressed by the water collecting unit.

* * * * *